US007047403B2

(12) United States Patent
Lin (10) Patent No.: US 7,047,403 B2
(45) Date of Patent: May 16, 2006

(54) METHOD AND SYSTEM FOR OPERATING SYSTEM RECOVERY AND METHOD OF USING BUILD-TO-CONFIGURATION MODE TO MODEL COMPUTER SYSTEM

(75) Inventor: Wen-Pin Lin, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 417 days.

(21) Appl. No.: 10/652,132

(22) Filed: Aug. 28, 2003

(65) Prior Publication Data

US 2004/0153733 A1    Aug. 5, 2004

(30) Foreign Application Priority Data

Aug. 30, 2002 (TW) ................. 91119778 A (51) Int. Cl.
*G06F 9/445* (2006.01)

(52) U.S. Cl. ........................................... 713/100

(58) Field of Classification Search ............. None
See application file for complete search history.

(56) References Cited

U.S. PATENT DOCUMENTS

| 6,754,855 B1* | 6/2004 | Denninghoff et al. ......... 714/48 |
| 6,859,925 B1* | 2/2005 | Lin ............................. 717/178 |
| 6,901,493 B1* | 5/2005 | Maffezzoni ................. 711/162 |
| 2002/0049966 A1* | 4/2002 | Lin ............................. 717/178 |

* cited by examiner

*Primary Examiner*—John R. Cottingham
(74) *Attorney, Agent, or Firm*—Ladas & Parry LLP (57) ABSTRACT

A system for operating system recovery is proposed and includes a data storage device having a first partition, a second partition and a third partition including bootable files, and a BIOS (basic input/output system) having a recovery function. When the recovery entry is accessed, the BIOS is enabled to boot the computer system to the third partition. After the computer system is booted, an OS image file in the second partition is unpacked into an integral copy of the operating system. The integral copy of operating system and a patch file in the second partition are copied to the first partition. Then, the third partition is set hidden and inactive, and the first partition is set active, and the computer system is rebooted to the first partition. The patch file is executed to patch the operating system in the first partition after the computer system is rebooted to the first partition.

26 Claims, 9 Drawing Sheets

METHOD AND SYSTEM FOR OPERATING SYSTEM RECOVERY AND METHOD OF USING BUILD-TO-CONFIGURATION MODE TO MODEL COMPUTER SYSTEM

BACKGROUND OF THE INVENTION

1. Field of the Invention

The present invention relates to a method and system for operating system recovery, and particularly to a method and system that recovers the operating system of a computer system using a disk-to-disk (D2D) method. The present invention further relates to using a build-to-configuration (BTC) mode to model computer systems.

2. Description of the Related Art

During the production of a computer system, the manufacturer usually installs an operating system (OS) in a data storage device, such as the hard disk of the computer system. The operating system includes related hardware device drivers and applications. The manufacturer generally installs an OS image file (copy) of an operating system in the hard disk of the computer system, and the computer system will unpack the OS image file in the hard disk to preset the operating system when users first power on the computer system.

The manufacturer may also install patch files or update files in a patch directory of the hard disk of the computer system, in which the patch files can be used to upgrade or patch the hardware device drivers and applications in the computer system. After the computer system presets the operating system, the computer system will copy the patch files to the corresponding location of the hardware device drivers and applications, and run the patch files to upgrade or patch hardware device drivers and applications accordingly.

Normally, a system disc (SCD) and a recovery disc (RCD) is accompanied with the computer system and provided to users in their entirety. The system disc includes patch files, applications and drivers. The recovery disc includes bootable files and an OS image file. When the hardware device drivers and applications of the computer system are to be updated, the manufacturer places the patch files (updated files) into the system disc. Thus, users may use the system disc to update corresponding hardware device drivers and applications.

If the computer system is sold to a country which allows multiple languages as official languages, such as Switzerland, the manufacturer may format the hard disk into a specific format and install OS image files in respective language versions respectively therein by a specific kit of tool, such as Microsoft Multiple Operating System Preinstallation Toolkit (MPK). Users may select one the OS image files to pre-setup the operating system when they first power on the computer system. In this case, three recovery discs for each language version as well as the computer system have to be presented to users in their entirety. However, only one of the recovery discs may include the bootable files under the regulation of the OS vendor. If the computer system encounters malfunction or failure, it is inconvenient to use the recovery disc having the bootable files to restart the computer system, and then use the recovery disc of the appropriate version to recover the computer system.

In addition, since software including the operating system, hardware device drivers and applications is necessary to be updated frequently, the cost of the system disc and the recovery disc has become burdens for the manufacturer.

SUMMARY OF THE INVENTION

It is therefore an object of the present invention to provide a method and system for recovering the operating system of a computer system by using a disk-to-disk (D2D) method without system and recovery discs.

Another object of the present invention is to provide a method and system that automatically searches and recovers applications of the computer system according to the version of the operating system determined by users.

Another object of the present invention is to provide a method of using build-to-configuration (BTC) mode to model a computer system.

To achieve the above objects, the present invention provides a system for operating system recovery. The system includes a data storage device having a first partition, a second partition and a third partition including bootable files, and a BIOS (Basic Input/Output System) having a system recovery function.

When the system recovery function is presented and executed, the BIOS is enabled to boot the computer system to the third partition. After the computer system is booted, an image copy of operating system in the second partition is unpacked into an integral copy of the operating system which is then copied to the first partition, and then the third partition is set as hidden and inactive. The first partition is then set active, and the computer system is rebooted to the first partition.

In addition, the second partition further includes a patch file. After the computer system is booted to the third partition, the patch file is copied to the first partition and executed to patch the operating system in the first partition after the computer system is rebooted to the first partition.

The second partition further includes a batch file. After the computer system is booted to the third partition, the batch file is executed to generate an installation file for applications or the patch file of the operating system to the first partition, and the installation file or the patch file is executed to install the applications or patch the operating system in the first partition after the computer system is rebooted to the first partition.

A method of operating system recovery is provided. First, a data storage device having a first partition, a second partition and a third partition including bootable files, and a BIOS (Basic Input/Output System) having a system recovery function are provided.

When the system recovery function is presented and executed, the third partition is activated, and the BIOS is enabled to boot the computer system to the third partition. After the computer system is booted, an OS image file in the second partition is unpacked into an integral copy of operating system and copy the integral copy of the operating system to the first partition. Then, the third partition is set as hidden and inactive, and the first partition is set active, and the computer system is rebooted to the first partition.

Similarly, the second partition further includes a patch file. After the computer system is booted to the third partition, the patch file is copied to the first partition, and the patch file is executed to patch the operating system in the first partition after the computer system is rebooted to the first partition. Further, the second partition includes a batch file. After the computer system is booted to the third partition, the batch file is executed to generate an installation file of the applications or the patch file of the operating system to the first partition, and the installation file or the patch file are executed to install the applications or patch the operating system in the first partition after the computer system is booted to the first partition.

A method of using build-to-configuration (BTC) mode to model a computer system is also provided. First, an order issued from a customer is received, designating at least one operating system and an application. Then, a data storage device of the computer system is partitioned into a first partition, a second partition, and a third partition. Thereafter, an image copy of the operating system and a batch file are stored in the second partition, in which the batch file generates an installation file of the application and patch files of the operating system in the first partition.

Afterward, the bootable files are stored in the third partition and the third partition is set hidden and inactive, and a system recovery function is provided to a BIOS (Basic Input/Output System) of the computer system. Finally, the computer system, including the BIOS having the system recovery function, the OS image file, and the batch file, is provided to users.

BRIEF DESCRIPTION OF THE DRAWINGS

The aforementioned objects, features and advantages of the present invention will become apparent by referring to the following detailed description of the preferred embodiment with reference to the accompanying drawings, wherein.

DETAILED DESCRIPTION OF THE INVENTION

First Embodiment

Figure 1:
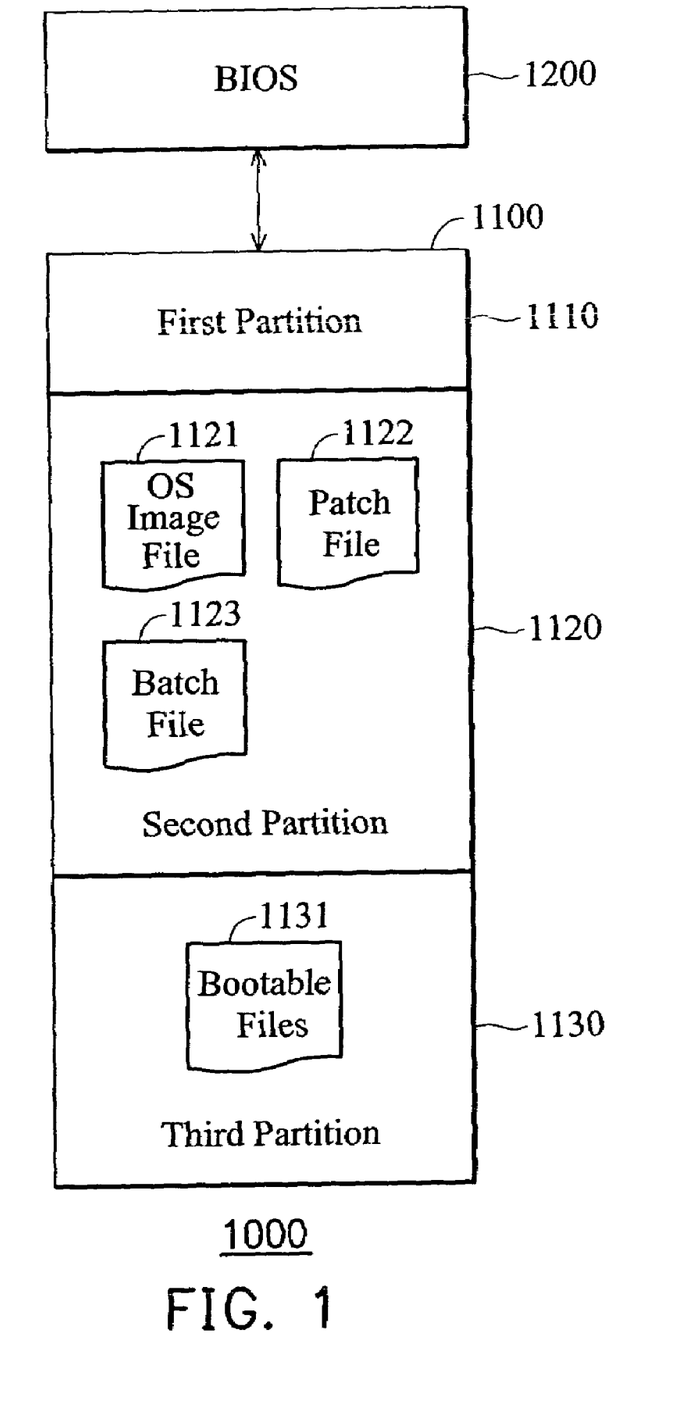
FIG. 1 is a schematic diagram illustrating the architecture of the system for operating system recovery according to a first embodiment of the present invention.

FIG. 1 illustrates the architecture of the system for operating system recovery according to the first embodiment of the present invention. The system for operating system recovery according to the present invention is suitable for use in a computer system. The system 1000 includes a data storage device 1100 and a BIOS (Basic Input/Output System) 1200 having a system recovery function.

The data storage device 1100 may be a hard disk of the computer system, and includes a first partition 1110, a second partition 1120 and a third partition 1130. The second partition 1120 has an OS image file 1121 corresponding to an operating system, a patch file 1122 (optional), and a batch file 1123 for generating an installation file of an application and at least one patch file of the operating system in the first partition 1110. The third partition 1130 includes bootable files 1131 and a label.

Figure 2:
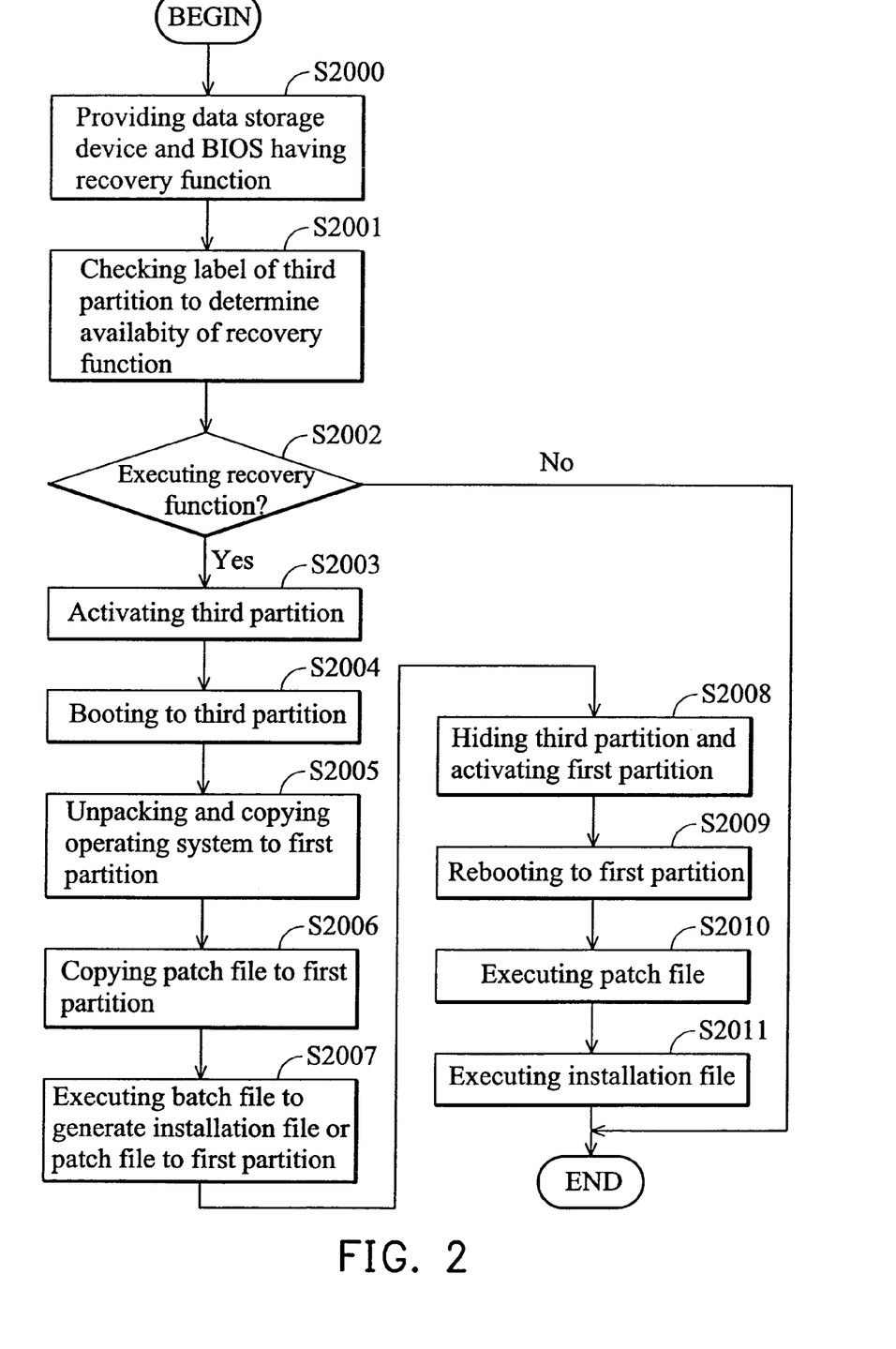
FIG. 2 is a flowchart showing the method of operating system recovery according to the first embodiment of the present invention.
Figure 3A:
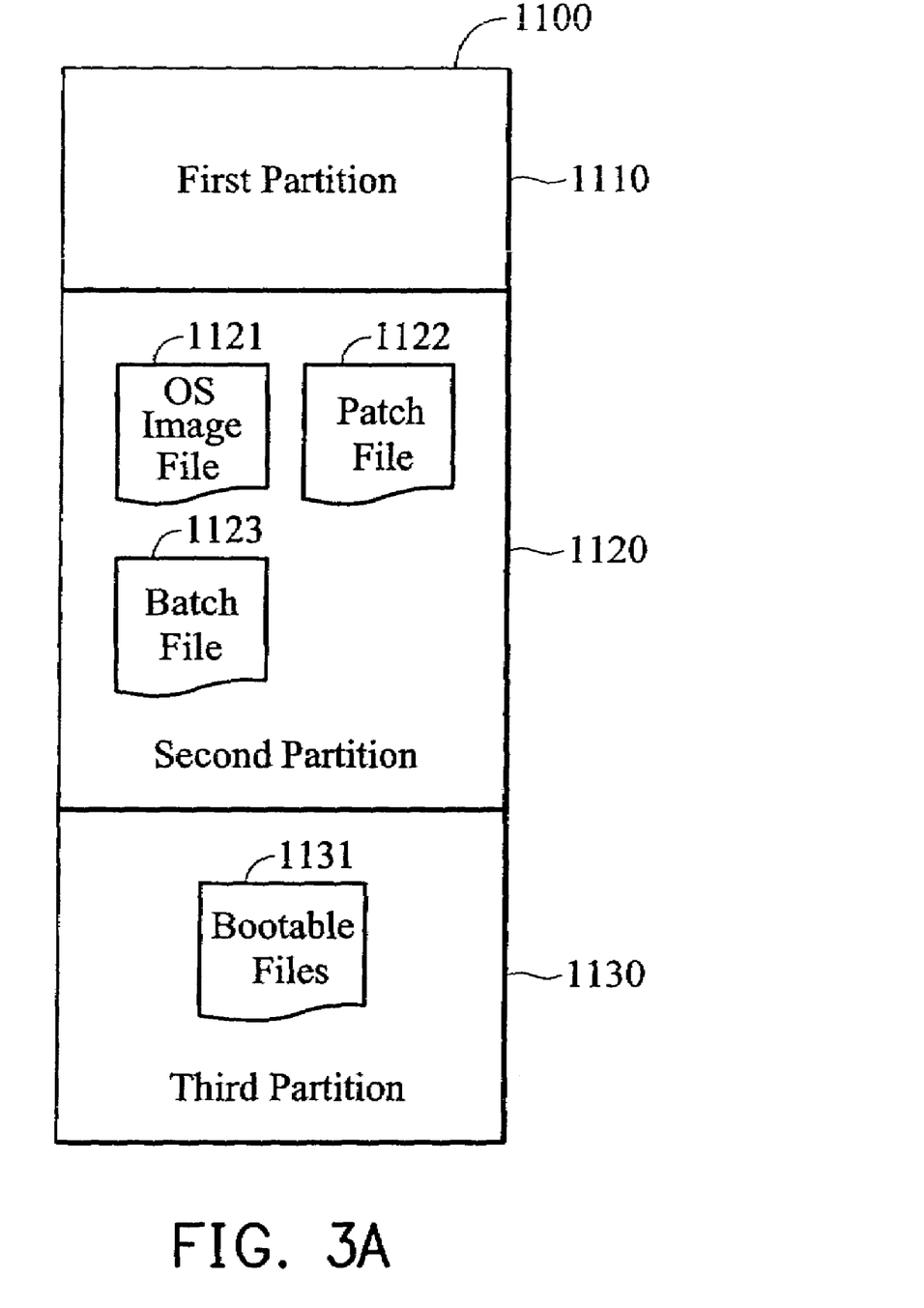
FIG. 3A is a schematic diagram illustrating the data storage device before operating system recovery according to the first embodiment of the present invention.

FIG. 2 shows the method of operating system recovery according to the first embodiment of the present invention. FIG. 3A illustrates the data storage device 1100 before operating system recovery.

First, in step S2000, a data storage device 1100 having a first partition 1110, a second partition 1120 and a third partition 1130 including bootable files 1131, and a BIOS (Basic Input/Output System) 1200 having a system recovery function are provided to the computer system. As shown in FIG. 3A, the second partition 1120 has an OS image file 1121, a patch file 1122 and a batch file 1123.

It should be noted that at step S2001, the BIOS 1200 may check the label of the third partition 1130, and present recovery function only if the label conforms to a predetermined ID.

If the system recovery function is not to be executed (No in step S2002), the process is ended. Otherwise, in step S2003, the BIOS 1200 presents and executes recovery function to activate the third partition 1130, and in step S2004, boots the computer system to the third partition 1130 using the bootable files 1131 therein.

After the computer system is booted to the third partition 1130, in step S2005, the OS image file 1121 in the second partition 1120 is unpacked into an integral copy of operating system 1111, which is then copied to the first partition 1110. Then, in step S2006, the patch file 1122 is copied to the first partition 1123, and in step S2007, the batch file 1123 is executed to generate an installation file 1112 of the applications or related patch files of the operating system to the first partition 1110. Then, in step S2008, the BIOS 1200 deactivates (hides) the third partition 1130, and activates the first partition 1110, and in step S2009, reboots the computer system to the first partition 1200.

Figure 3B:
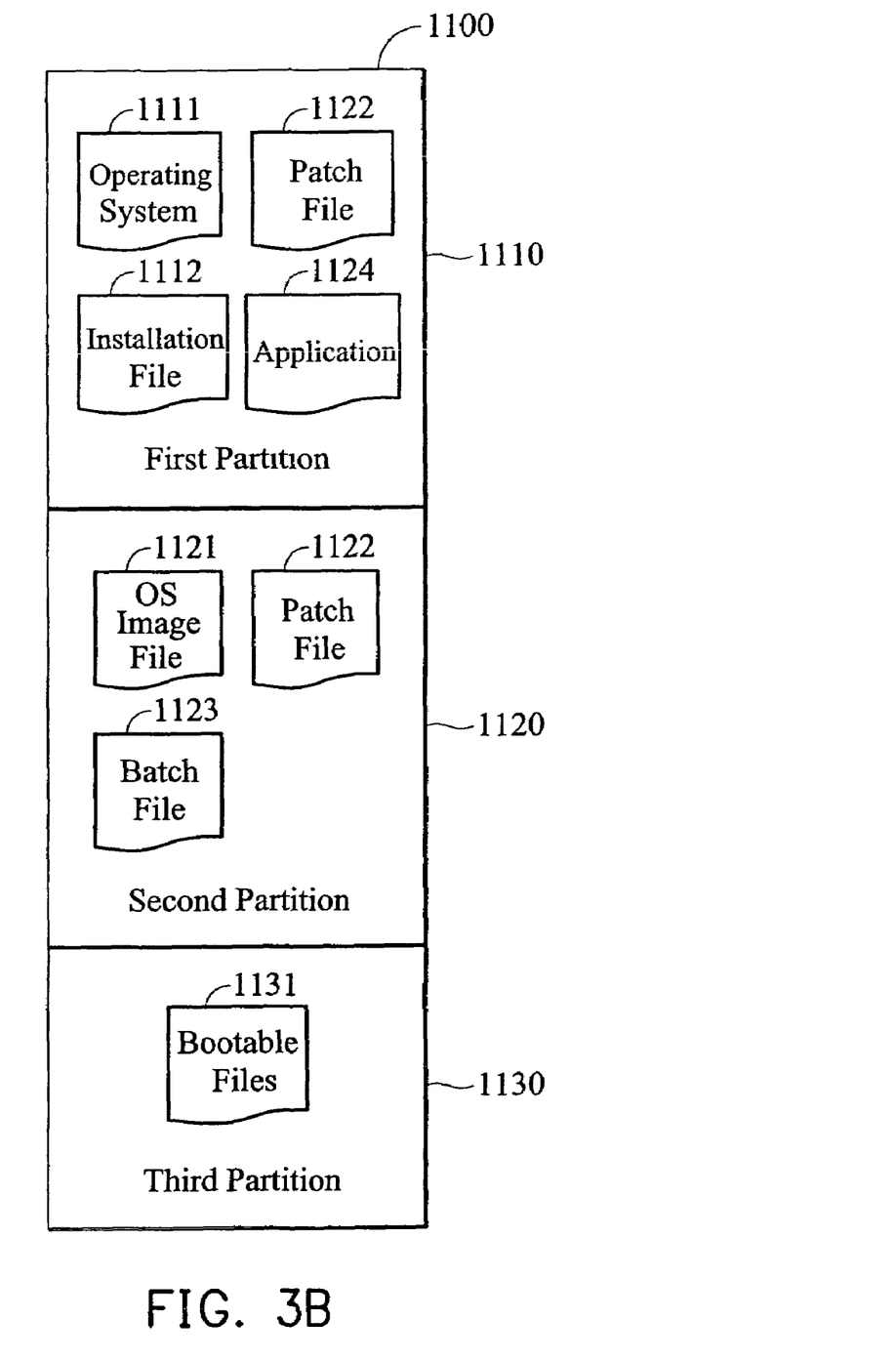
FIG. 3B is a schematic diagram illustrating the data storage device after operating system recovery according to the first embodiment of the present invention.

After the computer system is rebooted to the first partition 1200, in step S2010, the patch file 1122 is executed to patch the operating system 1111 in the first partition 1110, and in step S2011, the installation file 1112 is executed to install an application 1124 in the first partition 1110. The data storage device 1100 after operating system recovery is shown in FIG. 3B.

It should be noted that the BIOS 1200 may disable the recovery function, and hide the OS image file 1121, the patch file 1122 and the batch file 1123 after the computer system is booted to the third partition 1130.

Second Embodiment

Figure 4:
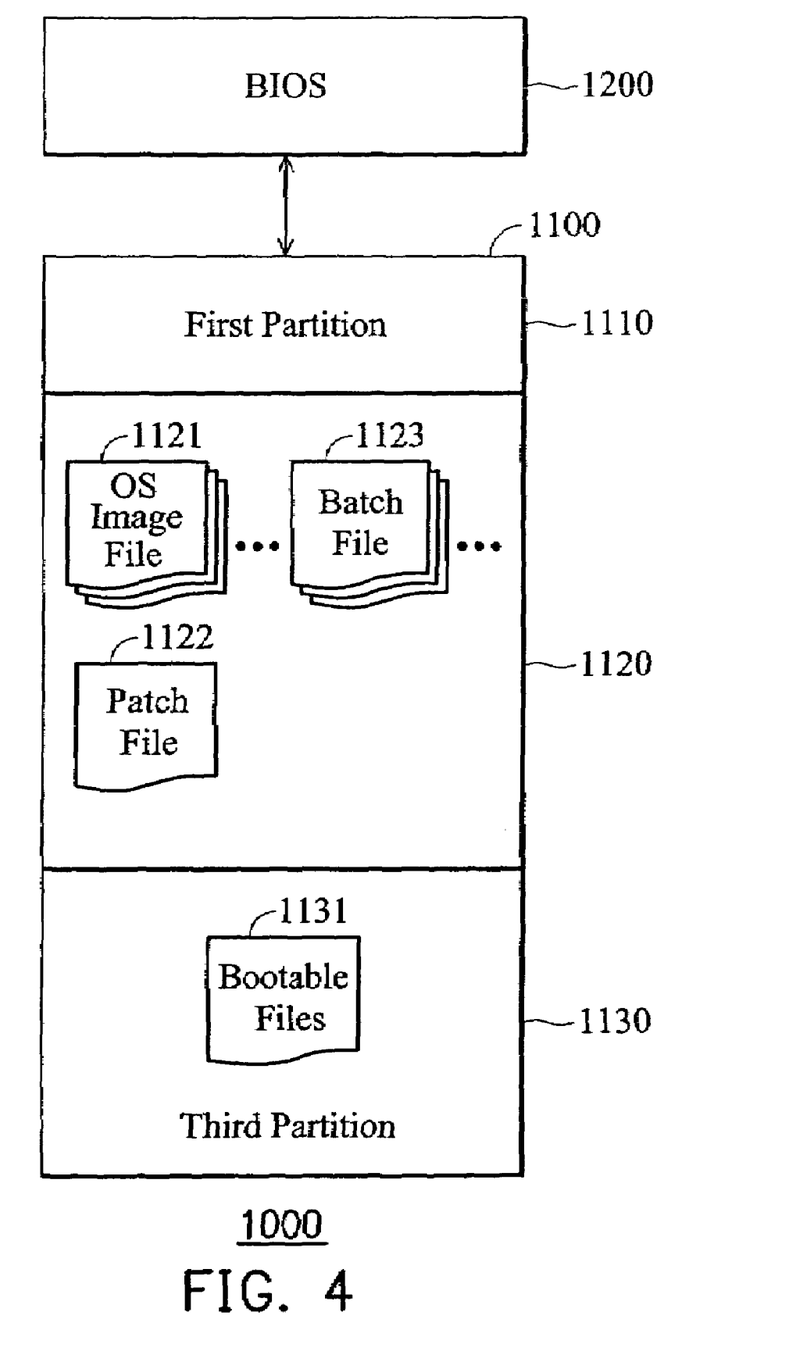
FIG. 4 is a schematic diagram illustrating the architecture of the system for operating system recovery according to a second embodiment of the present invention.

FIG. 4 illustrates the architecture of the apparatus for operating system recovery according to the second embodiment of the present invention. It should be noted that the second embodiment is adapted for computer systems providing operating system of multiple language versions. The apparatus 1000 includes a data storage device 1100 and a BIOS (Basic Input/Output System) 1200 having a recovery function.

The data storage device 1100 may be a hard disk of the computer system, and includes a first partition 1110, a second partition 1120 and a third partition 1130. The second partition 1120 has a plurality of OS image files 1121, a patch file 1122 (optional), and a plurality of batch files 1123 to generate respective installation files of applications and at least one patch file of the operating system in the first partition 1110. The third partition 1130 includes bootable files 1131 and a label. Each of the OS image files 1121 correspond to a respective operating systems or an operating system with a different language version.

Figure 5:
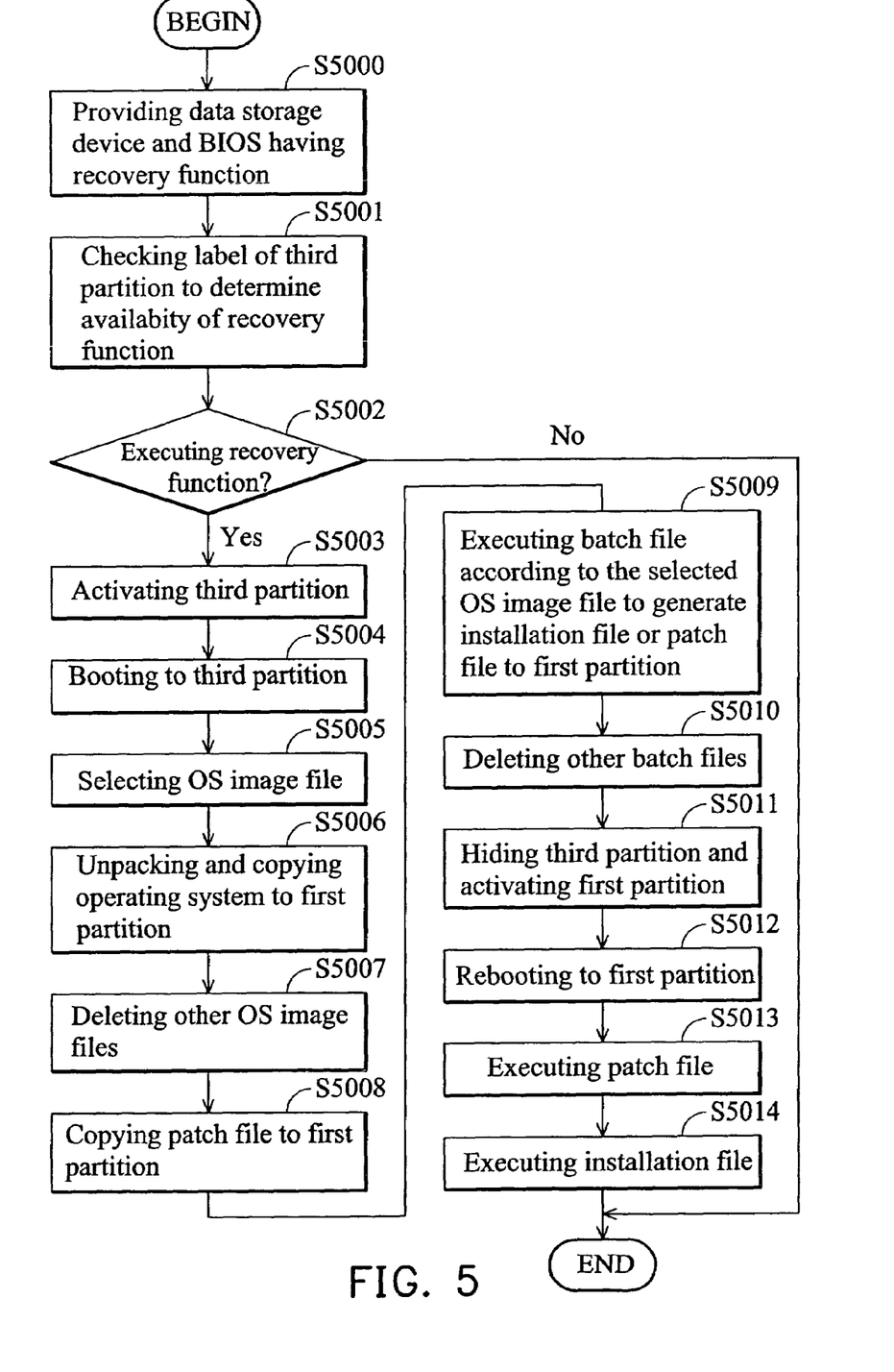
FIG. 5 is a flowchart showing the method of operating system recovery according to the second embodiment of the present invention.
Figure 6A:
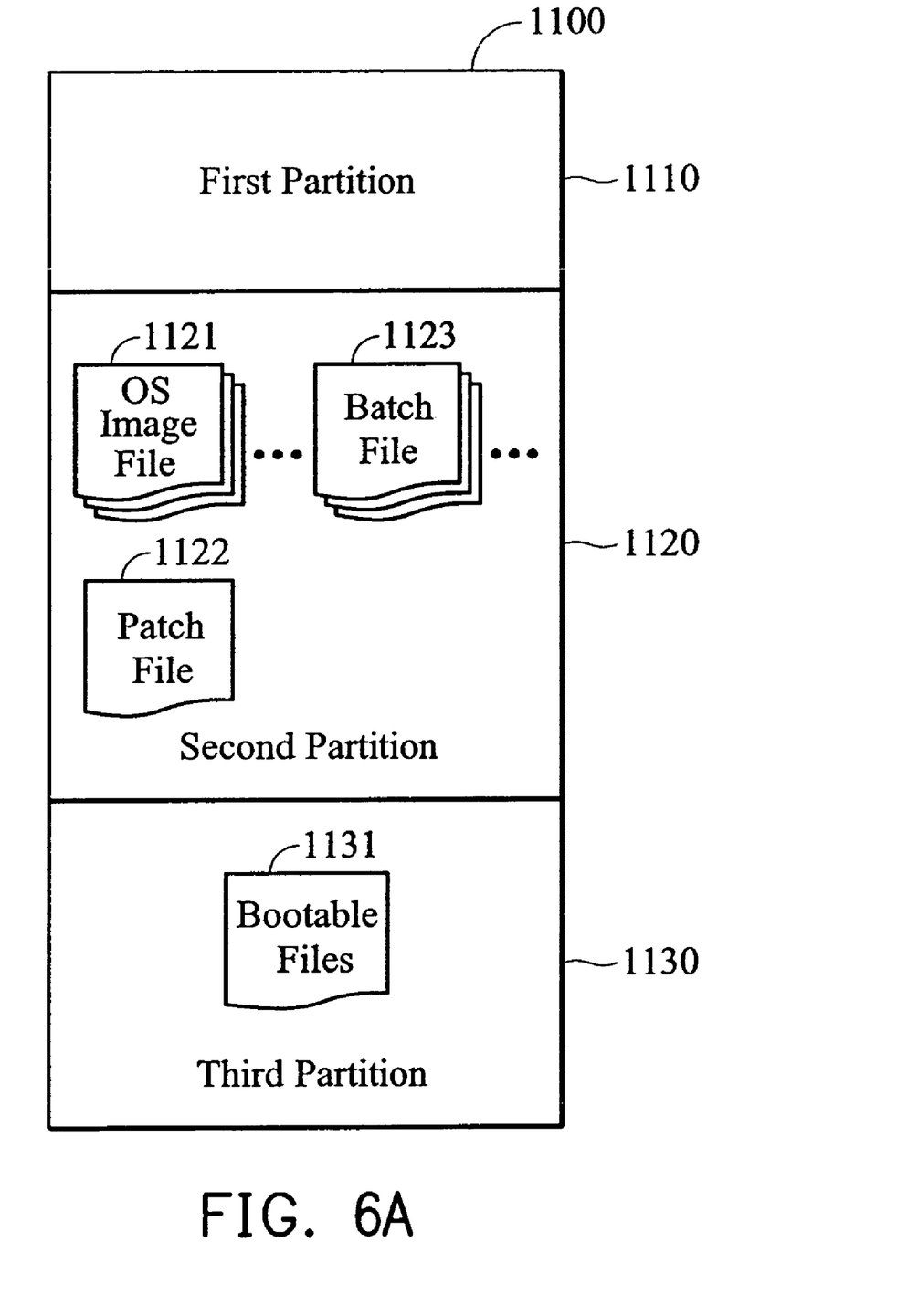
FIG. 6A is a schematic diagram illustrating the data storage device before operating system recovery according to the second embodiment of the present invention.

FIG. 5 shows the method of operating system recovery according to the second embodiment of the present invention. FIG. 6A illustrates the data storage device 1110 before operating system recovery.

First, in step S5000, a data storage device 1100 having a first partition 1110, a second partition 1120 and a third partition 1130 including bootable files 1131, and a BIOS (Basic Input/Output System) 1200 having a system recovery function are provided to the computer system. As shown in FIG. 6A, the second partition 1120 has a plurality of OS image files 1121, a patch file 1122 and a plurality of batch files 1123. Similarly, each of the OS image files 1121 is an image file corresponding to a respective operating system or an operating system with a different language version. In step S5001, the BIOS 1200 may check the label of the third partition 1130, and presents system recovery function only if the label conforms to a predetermined ID.

If the system recovery function is not to be executed (No in step S5002), the process is ended. Otherwise, (Yes in step S5001), in step S5003, the BIOS 1200 provides and executes the recovery function and activates the third partition 1130, and in step S5004, boots the computer system to the third partition 1130 using the bootable files 1131 therein.

After the computer system is booted to the third partition 1130, the OS image files 1121 in the second partition 1120 can be detected. Then, in step S5005, an interface is provided for users to select an OS image file 1121 to recover. If done, in step S5006, the selected OS image file 1121 in the second partition 1120 is unpacked into an integral copy of operating system 1111, which is then copied to the first partition 1110. Then, in step S5007, other OS image files 1121 are deleted.

Then, in step S5008, the patch file 1122 is copied to the first partition 1123, and in step S5009, the batch file 1123 corresponding to the selected OS image file 1121 is executed to generate an installation file 1112 of the application 1124 or related patch files to the first partition 1110. It should be noted that since the patch files or applications are dedicated to the selected operating system, the batch file corresponding to the patch files or application may be executed directly. Then, in step S5010, other batch files are deleted.

Thereafter, in step S5011, the BIOS 1200 deactivates (hides) the third partition 1130, and activates the first partition 1110, and in step S5012, reboots the computer system to the first partition 1200.

Figure 6B:
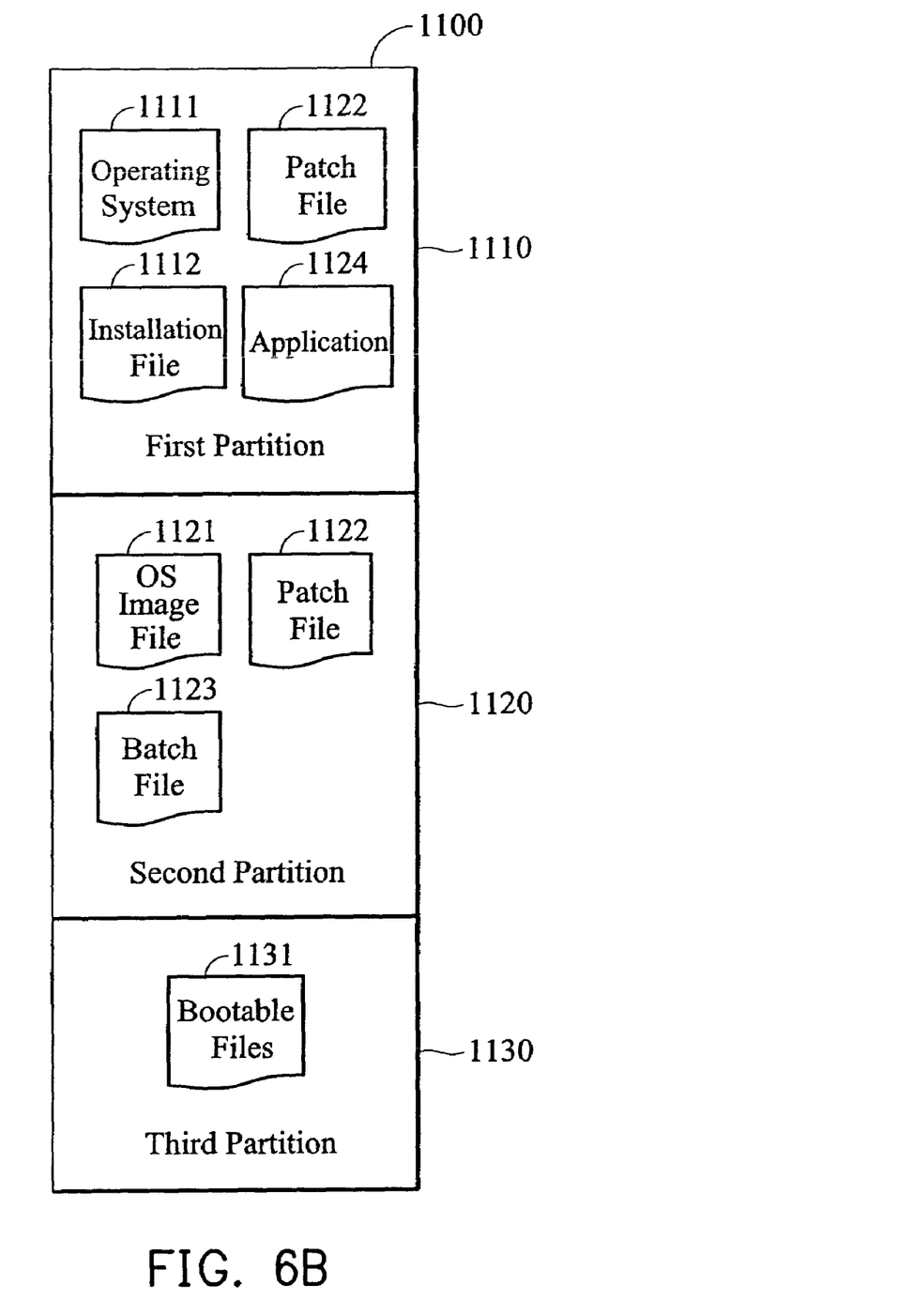
FIG. 6B is a schematic diagram illustrating the data storage device after operating system recovery according to the second embodiment of the present invention.

After the computer system is rebooted to the first partition 1200, in step S5013, the patch file 1122 is executed to patch the operating system 1111 in the first partition 1110, and in step S5014, the installation file 1112 is executed to install the application 1124 in the first partition 1110. The data storage device 1100 after operating system recovery is shown in FIG. 6B.

It should be noted that the BIOS 1200 may disable the recovery function, and hides the OS image file 1121, the patch file 1122 and the batch file 1123 after the computer system is booted to the third partition 1130.

Third Embodiment

Figure 7:
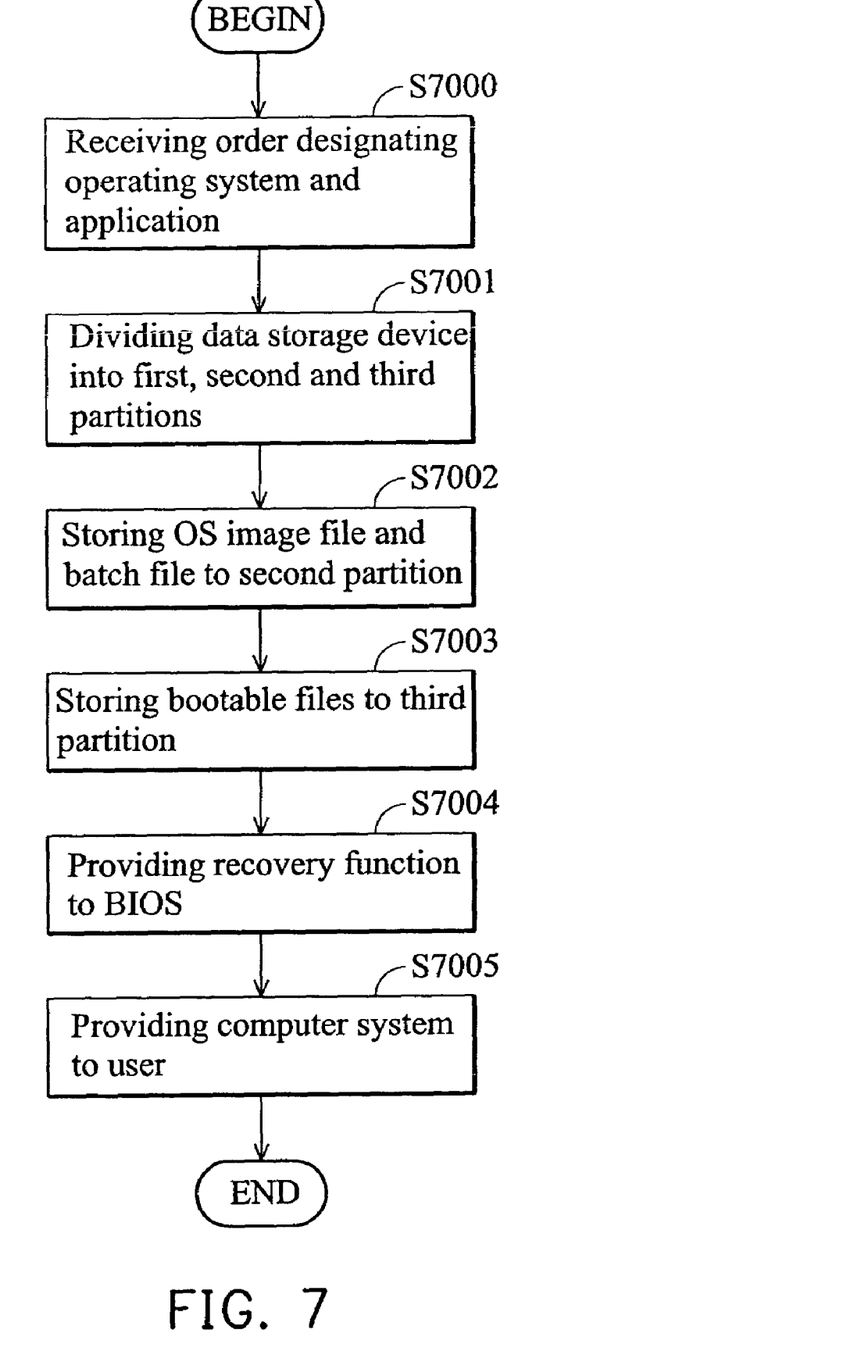
FIG. 7 is a flowchart showing the process of using build-to-configuration (BTC) manufacturing mode to model a computer system according to a third embodiment of the present invention.

FIG. 7 shows the method of using build-to-configuration (BTC) mode for modeling a computer system according to the third embodiment of the present invention, which provides a business method for receiving an order from a customer, installing an OS image file, a patch file and applications designated by the order to the hard disk of the computer system, and providing the recovery function to the computer system.

First, in step S7000, an order is received from a customer, designating at least one operating system, an application, or a patch file of the operating system. Then, in step S7001, a data storage device of the computer system is partitioned into a first partition, a second partition and a third partition. Thereafter, in step S7002, an OS image file of the operating system and a batch file are stored in the second partition, in which the batch file generates an installation file of the application and the patch file of the operating system in the first partition.

Afterward, in step S7003, bootable files are stored in the third partition, which is a hidden partition. Then, in step S7004, a recovery function is provided to a BIOS (Basic Input/Output System) of the computer system. Finally, in step S7005, the computer system, including the BIOS having the system recovery function, the OS image file, and the batch file, is provided to users.

It should be noted that the recovery function can be used to install the operating system when users first power on the computer system or recover the operating system if the computer system encounters malfunction or failure. The operation of the recovery function is similar to the first and second embodiments.

As a result, using the method and apparatus for operating system recovery according to the present invention, the operating system of a computer system can be recovered using a disk to disk (D2D) method without system and recovery discs so as to improve the efficiency of system recovery and save resources expended during production.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A system for operating system recovery in a computer system, comprising:
   a data storage device, comprising;
      a first partition;
      a second partition including an image copy of an operating system; and
      a third partition including bootable files; and
   a basic input/output system having a system recovery function to activate the third partition and boot the computer system to the third partition if the system recovery function is executed,
   wherein after the computer system is booted to the third partition, the computer system unpacks the image copy of the operating system in the second partition into an integral copy of operating system and copies the integral copy of operating system to the first partition, deactivate the third partition, activates the first partition, and reboots the computer system to the first partition.

2. The system for operating system recovery as claimed in claim 1 wherein the third partition has a label, and the basic input/output system further checks the label and presents the system recovery function if the label conforms to a predetermined ID.

3. The system for operating system recovery as claimed in claim 1 wherein the basic input/output system further disables the system recovery function if the computer system is booted to the third partition.

4. The system for operating system recovery as claimed in claim 1 wherein the second partition further includes a batch file to generate an installation file of an application or a patch file of the operating system, and wherein the batch file is executed to generate the installation file of the application or the patch file of the operating system to the first partition after the computer system is booted to the third partition.

5. The system for operating system recovery as claimed in claim 4 wherein the installation file or the patch file are executed to install the application or patch the operating system in the first partition after the computer system is rebooted to the first partition.

6. The system for operating system recovery as claimed in claim 1 wherein the operating system image file and the batch file are hidden in the second partition.

7. A system for operating system recovery in a computer system, comprising:
    a data storage device, comprising;
        a first partition;
        a second partition including a plurality image copies of an operating system and a plurality of batch files; and
        a third partition including bootable files; and
    a basic input/output system having a system recovery function to activate the third partition and boot the computer system to the third partition if the recovery function is executed,
    wherein after the computer system is booted and one of the image copies of the operating system in the second partition is selected, the computer system unpacks the selected image copy of the operating system into an integral copy of the operating system and copies the integral copy of the operating system to the first partition, selects one of the batch files according to the selected image copy of the operating system, executes the selected batch file to generate an installation file of an application or a patch file of the operating system to the first partition, deactivates the third partition, activates the first partition, and reboots the computer system to the first partition.

8. The system for operating system recovery as claimed in claim 7 wherein the third partition has a label, and the basic input/output system further checks the label, and presenting the system recovery function if the label conforms to a predetermined ID.

9. The system for operating system recovery as claimed in claim 7 wherein the basic input/output system further disables the system recovery function if the computer system is booted to the third partition.

10. The system for operating system recovery as claimed in claim 7 wherein the installation file or the patch file are executed to install the application or patch the operating system in the first partition after the computer system is rebooted to the first partition.

11. The system for operating system recovery as claimed in claim 7 wherein the basic input/output system further deletes all image copies of the operating system other than the selected image copy of the operating system and all batch files other than the selected batch file from the second partition.

12. The system for operating system recovery as claimed in claim 7 wherein the image copies of the operating system and the batch files are hidden in the second partition.

13. A method of operating system recovery for a computer system, comprising the steps of:
    providing a data storage device comprising a first partition, a second partition including an image copy of an operating system and a third partition including bootable files;
    providing a basic input/output system having a system recovery function;
    if the system recovery function is executed, activating the third partition and booting the computer system thereto; and
        unpacking the operating system image file from the second partition into an integral copy of the operating system and copying the integral copy of the operating system to the first partition;
        deactivating the third partition and activating the first partition; and
        rebooting the computer system to the first partition.

14. The method of operating system recovery as claimed in claim 13 further comprising checking a label of the third partition, and presenting the system recovery function if the label conforms to a predetermined ID.

15. The method of operating system recovery as claimed in claim 13 further comprising disabling the system recovery function if the computer system is booted to the third partition.

16. The method of operating system recovery as claimed in claim 13 wherein the second partition further includes a batch file to generate an installation file of an application or a patch file of the operating system, and the method further comprising executing the batch file to generate the installation file of the application or the patch file of the operating system to the first partition after the computer system is booted to the third partition.

17. The method of operating system recovery as claimed in claim 16 further comprising executing the installation file or the patch file to install the application or patch the operating system in the first partition after the computer system is rebooted to the first partition.

18. A method of operating system recovery for a computer system, comprising the steps of:
    providing a data storage device comprising a first partition, a second partition including a plurality of image copies of an operating system and a plurality of batch files and a third partition including bootable files;
    providing a basic input/output system having a system recovery function;
    if the system recovery function is executed, activating the third partition and booting the computer system thereto; and
        after the computer system is booted and one of the image copies of the operating system in the second partition is selected, unpacking the selected image copy of the operating system into an integral copy of an operating system and copying the integral copy of the operating system to the first partition;
        selecting one of the batch files according to the selected image copy of the operating system;
        executing the selected batch file to generate an installation file of an application or a patch file of the operating system to the first partition;

deactivating the third partition and activating the first partition; and rebooting the computer system to the first partition.

19. The method of operating system recovery as claimed in claim 18 further comprising checking a label of the third partition and presenting the system recovery function if the label conforms to a predetermined ID.

20. The method of operating system recovery as claimed in claim 18 further comprising disabling the system recovery function if the computer system is booted to the third partition.

21. The method of operating system recovery as claimed in claim 18 further comprising executing the installation file or the patch file to install the application or patch the operating system in the first partition after the computer system is rebooted to the first partition.

22. The method of operating system recovery as claimed in claim 18 further comprising deleting all image copies of the operating system other than the selected image copy of the operating system and all batch files other than the selected batch file from the second partition.

23. The method of operating system recovery as claimed in claim 18 wherein the image copies of the operating system and the batch files are hidden in the second partition.

24. A method of modeling a computer system, comprising the steps of:

receiving an order from a customer, designating at least an operating system and an application or patch file for the operating system;

partitioning a data storage device of the computer system into a first partition, a second partition and a third partition;

storing an image copy of the designated operating system and a batch file in the second partition, in which the batch file generates an installation file of the application and the patch file for the operating system in the first partition;

storing bootable files in the third partition and hide the third partition;

providing a system recovery function to a basic input/output system; and providing the computer system, including the basic input/output system having the system recovery function, the image copy of the designated operating system, and the batch file, to the customer.

25. The method as claimed in claim 24 wherein when the system recovery function is executed, further comprising the steps of:

activating the third partition and booting the computer system thereto;

after the computer system is booted, unpacking the image copy of the operating system in the second partition into an integral copy of the operating system and copying the integral copy of the operating system to the first partition;

executing the batch file to generate the installation file of the application or the patch file of the operating system to the first partition;

deactivating the third partition and activating the first partition; and rebooting the computer system to the first partition.

26. The method as claimed in claim 25 further comprising executing the installation file or the patch file to install the application or patch the operating system in the first partition after the computer system is rebooted to the first partition.

* * * * *